US011021550B2

(12) United States Patent
Takano et al.

(10) Patent No.: US 11,021,550 B2
(45) Date of Patent: Jun. 1, 2021

(54) METHOD FOR PRODUCING MULTICOMPONENT COPOLYMER, MULTICOMPONENT COPOLYMER, RUBBER COMPOSITION, AND TIRE

(71) Applicant: BRIDGESTONE CORPORATION, Tokyo (JP)

(72) Inventors: Shigenaga Takano, Kodaira (JP); Aya Yanagisawa, Higashimurayama (JP); Olivier Tardif, Itabashi-ku (JP); Yasuo Horikawa, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/605,931

(22) PCT Filed: Apr. 16, 2018

(86) PCT No.: PCT/JP2018/015724
§ 371 (c)(1),
(2) Date: Oct. 17, 2019

(87) PCT Pub. No.: WO2018/194027
PCT Pub. Date: Oct. 25, 2018

(65) Prior Publication Data
US 2020/0140576 A1    May 7, 2020

(30) Foreign Application Priority Data

Apr. 18, 2017 (JP) .............................. JP2017-082360

(51) Int. Cl.
*C08F 2/06*     (2006.01)
*B60C 1/00*     (2006.01)
*C08F 210/02*   (2006.01)
*C08F 212/08*   (2006.01)
*C08F 236/06*   (2006.01)
*C08F 2/00*     (2006.01)
*C08L 23/08*    (2006.01)

(52) U.S. Cl.
CPC .................. *C08F 2/06* (2013.01); *B60C 1/00* (2013.01); *C08F 2/00* (2013.01); *C08F 210/02* (2013.01); *C08F 212/08* (2013.01); *C08F 236/06* (2013.01); *C08L 23/08* (2013.01)

(58) Field of Classification Search
CPC ........ C08F 236/06; C08F 2/00; C08F 212/08; C08F 2/06; C08F 210/02; B60C 1/00; C08L 23/08
See application file for complete search history.

(56) References Cited

U.S. PATENT DOCUMENTS

| | | |
|---|---|---|
| 6,310,164 B1 | 10/2001 | Morizono et al. |
| 2013/0197157 A1 | 8/2013 | Kaita et al. |
| 2013/0211032 A1 | 8/2013 | Kaita |
| 2017/0129981 A1 | 5/2017 | Oishi et al. |
| 2017/0137552 A1 | 5/2017 | Oishi et al. |

FOREIGN PATENT DOCUMENTS

| | | |
|---|---|---|
| EP | 0 323 569 A2 | 7/1989 |
| EP | 1 777 240 A1 | 4/2007 |
| EP | 3 138 859 A1 | 3/2017 |
| JP | 2013-95896 A | 5/2013 |
| JP | 2015-221852 A | 12/2015 |
| WO | 2012/014420 A1 | 2/2012 |
| WO | 2012/014455 A1 | 2/2012 |
| WO | 2015/190072 A1 | 12/2015 |
| WO | 2015/190073 A1 | 12/2015 |

OTHER PUBLICATIONS

English Machine Translation of JP 2015-221852 (Year: 2015).*
International Preliminary Report on Patentability with translation of Written Opinion dated Oct. 22, 2019, in counterpart International Application No. PCT/JP2018/015724.
International Search Report for PCT/JP2018/015724 dated Jul. 10, 2018 [PCT/ISA/210].
Extended European Search Report dated Sep. 25, 2020, issued by the European Patent Office in application No. 18788323.6.

* cited by examiner

*Primary Examiner* — Angela C Scott
(74) *Attorney, Agent, or Firm* — Sughrue Mion, PLLC

(57) ABSTRACT

To provide a method for producing a multicomponent copolymer with which a multicomponent copolymer having excellent rupture strength can be obtained, and a multicomponent copolymer, a rubber composition and a tire having excellent rupture strength. The method is a method for producing a multicomponent copolymer having a conjugated diene unit, a non-conjugated olefin unit and an aromatic vinyl unit, comprising adding continuously or intermittently continuously a conjugated diene compound into a reactor containing a catalyst and at least one selected from the group consisting of a non-conjugated olefin compound and an aromatic vinyl compound. The multicomponent copolymer is obtained with the production method. The rubber composition comprises the multicomponent copolymer as a rubber component. The tire uses the rubber composition.

6 Claims, 2 Drawing Sheets

METHOD FOR PRODUCING MULTICOMPONENT COPOLYMER, MULTICOMPONENT COPOLYMER, RUBBER COMPOSITION, AND TIRE

CROSS REFERENCE TO RELATED APPLICATIONS

This application is a National Stage of International Application No. PCT/JP2018/015724, filed on Apr. 16, 2018, which claims priority from Japanese Patent Application No. 2017-082360, filed on Apr. 18, 2017.

TECHNICAL FIELD

This disclosure relates to a method for producing a multicomponent copolymer, a multicomponent copolymer, a rubber composition, and a tire.

BACKGROUND

Rubber products (such as tires, conveyor belts, antivibration rubbers, and seismic isolation rubbers) are generally required to have high durability (such as breaking resistance, wear resistance, and crack growth resistance) and high weather resistance. In order to meet such demands, various rubber components and rubber compositions have been developed.

For example, WO 2012/014455 A1 (PTL 1) describes a copolymer of a conjugated diene compound and a non-conjugated olefin, where the conjugated diene moiety (the moiety derived from the conjugated diene compound) has a cis-1,4 bond content of more than 70.5 mol %, and the non-conjugated olefin content is 10 mol % or more. PTL 1 also describes that the copolymer is used to produce a rubber having good crack growth resistance and weather resistance.

CITATION LIST

Patent Literature

PTL 1: WO 2012/014455 A1

SUMMARY

Technical Problem

After intensive study, however, we have discovered that the copolymer described in PTL 1 and the rubber composition comprising the copolymer still have room for improvement in terms of rupture strength.

It could thus be helpful to provide a method for producing a multicomponent copolymer with which a multicomponent copolymer having excellent rupture strength can be obtained, and a multicomponent copolymer, a rubber composition and a tire having excellent rupture strength.

Solution to Problem

The method for producing a multicomponent copolymer of the present disclosure is a method for producing a multicomponent copolymer having a conjugated diene unit, a non-conjugated olefin unit and an aromatic vinyl unit, the method comprising the step of: adding continuously or intermittently continuously a conjugated diene compound into a reactor containing a catalyst and at least one selected from the group consisting of a non-conjugated olefin compound and an aromatic vinyl compound. According to the method the present disclosure, it is possible to obtain a multicomponent copolymer having excellent rupture strength.

The multicomponent copolymer of the present disclosure is obtained with the above production method. The present disclosure can provide a multicomponent copolymer having excellent rupture strength.

The rubber composition of the present disclosure comprises the multicomponent copolymer as a rubber component. The present disclosure can provide a rubber composition having excellent rupture strength.

The tire of the present disclosure uses the rubber composition. The present disclosure can provide a tire having excellent rupture strength.

Advantageous Effect

According to the present disclosure, it is possible to provide a method for producing a multicomponent copolymer with which a multicomponent copolymer having excellent rupture strength can be obtained, and a copolymer, a rubber composition and a tire having excellent rupture strength.

DETAILED DESCRIPTION

The following describes embodiments of the present disclosure. The description is intended to exemplify the present disclosure and does not limit the present disclosure in any way.

In the present disclosure, two or more embodiments can optionally be combined.

The term "conjugated diene unit" herein refers to a unit derived from a conjugated diene compound in a multicomponent copolymer. The term "conjugated diene compound" herein refers to a diene compound with a conjugated system.

The term "non-conjugated olefin unit" herein refers to a unit derived from a non-conjugated olefin compound in a multicomponent copolymer. The term "non-conjugated olefin compound" herein refers to an unsaturated aliphatic hydrocarbon which is a non-conjugated compound having one or more carbon-carbon double bonds.

The term "aromatic vinyl unit" herein refers to a unit derived from an aromatic vinyl compound in a multicomponent copolymer. The term "aromatic vinyl compound" herein refers to an aromatic compound having at least a vinyl group. The "aromatic vinyl compound" herein is not included in the conjugated diene compound.

The term "multicomponent copolymer" herein refers to a copolymer obtained by polymerizing three or more types of monomers.

The term "intermittently continuously" means that a conjugated diene compound is added automatically at regular intervals.

(Method for Producing Multicomponent Copolymer)

The method for producing a multicomponent copolymer of the present disclosure is a method for producing a multicomponent copolymer having a conjugated diene unit, a non-conjugated olefin unit and an aromatic vinyl unit, the method comprising the step of: adding continuously or intermittently continuously a conjugated diene compound into a reactor containing a catalyst and at least one selected from the group consisting of a non-conjugated olefin compound and an aromatic vinyl compound. According to the method of the present disclosure, it is possible to obtain a multicomponent copolymer having excellent rupture strength. Although there may be other reasons, it is presumed that continuously or intermittently continuously adding a conjugated diene compound leads to a uniform conjugated diene chain length in the multicomponent copolymer, thereby leading to uniform crosslinking points in the multicomponent copolymer chain.

Figure 1:
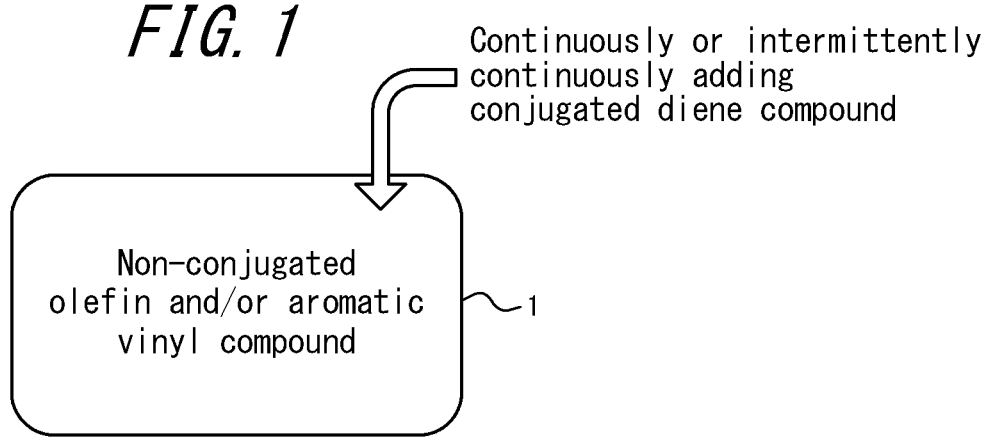
FIG. 1 schematically illustrates an example of the method for producing a multicomponent copolymer of the present disclosure.

FIG. 1 schematically illustrates an example of the method for producing a multicomponent copolymer of the present disclosure. In FIG. 1, the reactor 1 includes at least one selected from the group consisting of a non-conjugated olefin compound and an aromatic vinyl compound, and a conjugated diene compound is continuously or intermittently continuously added into the reactor 1. In FIGS. 1 to 4, the catalyst in the reactor is not illustrated for simplicity of explanation. It should be noted that in FIGS. 1 to 4, the arrow only represents the operation of adding the compound into the reactor. That is, the arrow itself does not represent the continuity or discontinuity of the addition, nor does the position of the arrow represent the addition direction or the position relative to the reactor.

<Conjugated Diene Compound>

The conjugated diene compound may be a known conjugated diene compound. The conjugated diene compound may be used alone or in a combination of two or more.

Examples of the conjugated diene compound include 1,3-butadiene, isoprene, 1,3-pentadiene, and 2,3-dimethyl-1,3-butadiene. In one embodiment, the conjugated diene compound has 4 to 8 carbon atoms. From the viewpoint of availability, the conjugated diene compound is preferably butadiene or isoprene.

In one embodiment, the conjugated diene compound is at least one selected from the group consisting of 1,3-butadiene and isoprene. In this case, the conjugated diene unit is at least one selected from the group consisting of a butadiene unit and an isoprene unit. In another embodiment, the conjugated diene compound is only 1,3-butadiene. In this case, the conjugated diene unit is only a butadiene unit.

In the method of the present disclosure, it is preferable to continuously or intermittently continuously add the conjugated diene compound in an amount of 0.1 mmol to 20 mmol per minute, and more preferable to continuously or intermittently continuously add the conjugated diene compound in an amount of 0.1 mmol to 10 mmol per minute. This improves the rupture strength and breaking elongation.

In the step of adding continuously or intermittently continuously the conjugated diene compound, the concentration of the conjugated diene compound to be added may be appropriately selected, and may be, for example, 10 wt. % to 100 wt. %. In the case of 100 wt. %, the conjugated diene compound is added alone without diluting it with a solvent. The concentration is preferably 10 wt. % to 35 wt. %.

The solvent may be appropriately selected from known solvents used in the polymerization of conjugated diene compounds. Examples of the solvent include toluene, cyclohexane, and n-hexane.

In the step of adding continuously or intermittently continuously the conjugated diene compound, the concentration of the conjugated diene compound to be added may be constant during the polymerization of the multicomponent copolymer, or may vary depending on the polymerization time. In the case where the concentration of the conjugated diene compound to be added varies depending on the polymerization time, the concentration of the conjugated diene compound solution may vary from a low concentration to a high concentration or from a high concentration to a low concentration as the polymerization time increases.

In the step of adding continuously or intermittently continuously the conjugated diene compound, the ratio of the mole of the conjugated diene compound to the mole of the catalyst, i.e. the molar ratio, may be appropriately adjusted. For example, the amount (mole) of the conjugated diene compound may be 1 to 1,000,000 times that of the catalyst.

In the step of adding continuously or intermittently continuously the conjugated diene compound, the amount (volume) of the conjugated diene added per minute may be appropriately adjusted, and may be, for example, 0.001 mL to 30 mL. When continuously or intermittently continuously adding a solution containing the conjugated diene compound and the solvent, the amount of the solution may be 0.004 mL to 30 mL per minute, 0.04 mL to 3 mL per minute, or 0.3 mL to 1 mL per minute, for example.

The time for adding continuously or intermittently continuously the conjugated diene compound is not particularly limited and may be appropriately adjusted. For example, it may be 5 minutes or more. In the method of the present disclosure, the time for adding continuously or intermittently continuously the conjugated diene compound is preferably 10 seconds to 100 hours, and more preferably 1 hour to 100 hours. This makes it possible to control the endothermic peak (enthalpy relaxation, $\Delta H$ (J/g)), that is, it is possible to control the chain length of the non-conjugated olefin. The time for adding continuously or intermittently continuously the conjugated diene compound is still more preferably 1 hour to 10 hours. The time for adding continuously or intermittently continuously the conjugated diene compound herein is a time from the start of continuously or intermittently continuously adding the conjugated diene compound.

In the step of adding continuously or intermittently continuously the conjugated diene compound, the addition interval may be appropriately adjusted, and may be, for example, 1 second or more, 3 seconds or more, 5 seconds or more, 10 seconds or more, 30 seconds or more or 60 seconds or more, and 60 seconds or less, 30 seconds or less, 10 seconds or less, 5 seconds or less or 3 seconds or less.

<Non-Conjugated Olefin Compound>

The non-conjugated olefin compound may be a known non-conjugated olefin compound. The non-conjugated olefin compound may be used alone or in a combination of two or more.

Examples of the non-conjugated olefin compounds include α-olefins such as ethylene, propylene, 1-butene, 1-pentene, 1-hexene, 1-heptene and 1-octene; non-conjugated cyclic olefins such as norbornene; and heteroatom-substituted alkene compounds such as vinyl pivalate, 1-phenylthioethene and N-vinylpyrrolidone. In one embodiment, the non-conjugated olefin compound has 2 to 10 carbon atoms. From the viewpoint of availability, the non-conjugated olefin compound is preferably ethylene.

In order to generate crystals that can function well as a reinforcing material to further improve the crack resistance and wear resistance, the non-conjugated olefin compound is preferably an acyclic non-conjugated olefin compound. The acyclic non-conjugated olefin compound is more preferably an α-olefin and more preferably an α-olefin containing ethylene. From the viewpoint of further improving the low heat generating property and wear resistance and from the viewpoint of cost, it preferably consists only of ethylene.

In the step of adding continuously or intermittently continuously the conjugated diene compound, when the reactor contains a non-conjugated olefin compound before continuously or intermittently continuously adding the conjugated diene compound, the amount of the non-conjugated olefin compound may be appropriately adjusted. The amount is preferably 40 mol to 99.8 mol.

<Aromatic Vinyl Compound>

The aromatic vinyl compound may be a known aromatic vinyl compound. The aromatic vinyl compound may be used alone or in a combination of two or more.

Examples of the aromatic vinyl compound include: styrene, o-methylstyrene, m-methylstyrene, p-methylstyrene, o,p-dimethylstyrene, o-ethylstyrene, m-ethylstyrene, and p-ethylstyrene. From the viewpoint of availability, the aromatic vinyl compound is preferably styrene.

By using an aromatic vinyl compound, that is, by containing an aromatic vinyl unit in the polymer, it is possible to control the chain length of the non-conjugated olefin, thereby improving the rupture strength and breaking elongation.

From the viewpoint of improving the wear resistance and the compatibility with general-purpose rubbers such as SBR, the aromatic vinyl compound preferably comprises styrene, and more preferably consists only of styrene.

In the step of adding continuously or intermittently continuously the conjugated diene compound, when the reactor contains an aromatic vinyl compound before continuously or intermittently continuously adding the conjugated diene compound, the amount of the aromatic vinyl compound may be appropriately adjusted. The amount is preferably 0.1 wt. % to 40 wt. %.

In the method of the present disclosure, monomers other than the above-described conjugated diene compound, non-conjugated olefin compound and aromatic vinyl compound may or may not be used. When the other monomers are not used, the multicomponent copolymer obtained with the method of the present disclosure has only a conjugated diene unit, a non-conjugated olefin unit and an aromatic vinyl unit.

<Catalyst>

The catalyst used in the method of the present disclosure is not particularly limited, and may be a catalyst used in a known copolymer production method. For example, it is preferable to use the polymerization catalyst composition described in PTL 1, JP 2016-210940 A, JP 2016-128552 A. The following exemplifies the polymerization catalyst composition.

<Polymerization Catalyst Composition>

The production method of the present disclosure preferably comprises the step of copolymerizing a conjugated diene compound, a non-conjugated olefin compound and an aromatic vinyl compound in the presence of a polymerization catalyst composition containing at least one complex selected from the group consisting of: a metallocene complex represented by the following general formula (I); a metallocene complex represented by the following general formula (II); and a half metallocene cation complex represented by the following general formula (III);

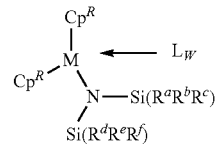

(I)

(where M represents a lanthanoid element, scandium or yttrium; each $Cp^R$ independently represents a substituted indenyl; $R^a$ to $R^f$ each independently represent an alkyl group having 1 to 3 carbon atoms or a hydrogen atom; L represents a neutral Lewis base; and w represents an integer of 0 to 3);

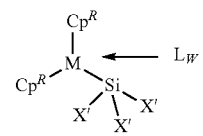

(II)

(where M represents a lanthanoid element, scandium or yttrium; each $Cp^R$ independently represents a substituted indenyl; X' represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3);

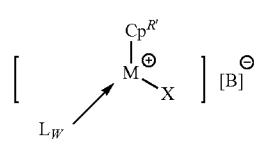

(III)

(where M represents a lanthanoid element, scandium or yttrium: $Cp^{R'}$ represents a substituted cyclopentadienyl, a substituted indenyl, or a substituted fluorenyl; X represents a hydrogen atom, a halogen atom, an alkoxide group, a thiolate group, an amide group, a silyl group, or a hydrocarbon group having 1 to 20 carbon atoms; L represents a neutral Lewis base; w represents an integer of 0 to 3; and [B]⁻ represents a non-coordinating anion).

The polymerization catalyst composition may further comprise other components that are contained in a general polymerization catalyst composition containing a metallocene complex, such as a co-catalyst. The metallocene complex herein is a complex compound in which one or more cyclopentadienyls or derivatives thereof are bonded to a central metal. In particular, a metallocene complex in which one cyclopentadienyl or its derivative is bonded to a central metal may be called a half metallocene complex.

In the polymerization system, the concentration of the complex contained in the polymerization catalyst composition is preferably within a range of 0.1 mol/L to 0.0001 mol/L.

In the metallocene complexes represented by the general formulae (I) and (II), $Cp^R$ in the formulae represents a substituted indenyl. $Cp^R$ having a substituted indenyl ring as a basic skeleton can be represented by $C_9H_{7-X}R_X$ or $C_9H_{11-X}R_X$, where X is the number of substituents on the substituted indenyl group and is an integer of 1 to 7 or 1 to 11. From the viewpoint of increasing the copolymerization ratio of the aromatic vinyl compound, X is preferably 2 or more, the substituent is preferably present on the 5-membered ring of the substituted indenyl group. It is preferable that each R independently represent a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a tert-butyl group, a phenyl group, and a benzyl group. Among the above, it is preferable that at least one R represent an aromatic group such as a phenyl group or a benzyl group from the viewpoint of increasing the copolymerization ratio of the aromatic vinyl compound. The reason is that, when X is 2 or more, or R has a bulky substituent such as an aromatic group, $Cp^R$ is more bulky, and the monomers to be polymerized approach the metal M, which is the catalytic center of the metallocene complexes represented by the general formulae (I) and (II), from the $NSi(R^aR^bR^c)Si(R^dR^eR^f)$ side or the $SiX'_3$ side because of steric hindrance, rendering it easy to introduce the vinyl moiety of the aromatic vinyl compound and the non-conjugated olefin compound. On the other hand, examples of the metalloid of the metalloid group include germyl Ge, stannyl Sn, and silyl Si. The metalloid group preferably has a hydrocarbyl group, and the hydrocarbyl group in the metalloid group is the same as the hydrocarbyl group described above. Specific examples of the metalloid group include a trimethylsilyl group. Specific examples of the substituted indenyl include 2-phenylindenyl, 2-methylindenyl, 1-methyl-2-phenylindenyl, 1,3-bis(t-butyldimethylsilyl)indenyl, 1-ethyl-2-phenylindenyl, and 1-benzyl-2-phenylindenyl. The two $Cp^R$ in the general formulae (I) and (II) may be the same as or different from each other.

For the half metallocene cation complex represented by the general formula (III), $Cp^{R'}$ in the formula represents a substituted cyclopentadienyl, a substituted indenyl, or a substituted fluorenyl. Among the above, $Cp^{R'}$ is preferably a substituted indenyl from the viewpoint of increasing the copolymerization ratio of the aromatic vinyl compound. $Cp^{R'}$ having a substituted cyclopentadienyl ring as a basic skeleton can be represented by $C_5H_{5-X}R_X$. Here, X is an integer of 1 to 4. X is preferably 2 or more from the viewpoint of increasing the copolymerization ratio of the aromatic vinyl compound, and the substituent is preferably present on the 5-membered ring of the substituted indenyl group. In addition, it is preferable that each R independently represent a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a tert-butyl group, a phenyl group, and a benzyl group. Among the above, it is preferable that at least one R represent an aromatic group such as a phenyl group or a benzyl group from the viewpoint of increasing the copolymerization ratio of the aromatic vinyl compound. The reason is that, when X is 2 or more, or R has a bulky substituent such as an aromatic group, $Cp^R$ is more bulky, and the monomers to be polymerized approach the metal M, which is the catalytic center of the metallocene complexes represented by the general formulae (I) and (II), from the NSi $(R^aR^bR^c)Si(R^dR^eR^f)$ side or the $SiX'_3$ side because of steric hindrance, rendering it easy to introduce the vinyl moiety of the aromatic vinyl compound and the non-conjugated olefin compound. On the other hand, examples of the metalloid of the metalloid group include germyl Ge, stannyl Sn, and silyl Si. The metalloid group preferably has a hydrocarbyl group, and the hydrocarbyl group in the metalloid group is the same as the hydrocarbyl group described above. Specific examples of the metalloid group include a trimethylsilyl group. Specific examples of $Cp^{R'}$ having a substituted cyclopentadienyl ring as a basic skeleton include the following:

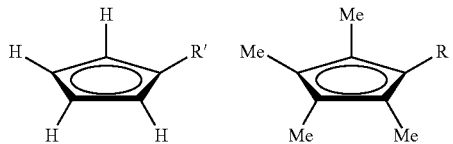

(where R' represents a methyl group or an ethyl group, and R represents a hydrogen atom, a methyl group, or an ethyl group).

In the general formula (III), $Cp^{R'}$ having a substituted indenyl ring as a basic skeleton is defined in a manner similar to $Cp^R$ in the general formula (I), and the preferred examples are also the same as those of $Cp^R$ in the general formula (I).

In the general formula (III), $Cp^{R'}$ having a substituted fluorenyl ring as a basic skeleton can be represented by $C_{13}H_{9-X}R_X$ or $C_{13}H_{17-X}R_X$. Here, X is an integer of 1 to 9 or 1 to 17. In addition, it is preferable that each R independently represent a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a tert-butyl group, a phenyl group, and a benzyl group. Among the above, it is preferable that at least one R represent an aromatic group such as a phenyl group or a benzyl group from the viewpoint of increasing the copolymerization ratio of the aromatic vinyl compound. The reason is that, when X is 2 or more, or R has a bulky substituent such as an aromatic group, $Cp^R$ is more bulky, and the monomers to be polymerized approach the metal M, which is the catalytic center of the metallocene complexes represented by the general formulae (I) and (II), from the NSi $(R^aR^bR^c)Si(R^dR^eR^f)$ side or the $SiX'_3$ side because of steric hindrance, rendering it easy to introduce the vinyl moiety of the aromatic vinyl compound and the non-conjugated olefin compound. On the other hand, examples of the metalloid of the metalloid group include germyl Ge, stannyl Sn, and silyl Si. The metalloid group preferably has a hydrocarbyl group, and the hydrocarbyl group in the metalloid group is the same as the hydrocarbyl group described above. Specific examples of the metalloid group include a trimethylsilyl group.

The central metal M in the general formulae (I), (II) and (III) is a lanthanoid element, scandium, or yttrium. The lanthanoid element includes 15 elements of atomic numbers 57 to 71, and may be any one of them. Preferred examples of the central metal M include samarium Sm, neodymium Nd, praseodymium Pr, gadolinium Gd, cerium Ce, holmium Ho, scandium Sc, and yttrium Y.

The metallocene complex represented by the general formula (I) contains a silylamide ligand [—$N(SiR_3)_2$]. R groups ($R^a$ to $R^f$ in the general formula (I)) contained in the silylamide ligand each independently represent an alkyl group having 1 to 3 carbon atoms or a hydrogen atom. It is preferable that at least one of $R^a$ to $R^f$ represent a hydrogen atom. With at least one of $R^a$ to $R^f$ representing a hydrogen atom, the catalyst can be easily synthesized and the bulk around silicon can be reduced, rendering it easy to introduce the non-conjugated olefin compound and the aromatic vinyl compound. From the same viewpoint, it is more preferable that at least one of $R^a$ to $R^c$ represent a hydrogen atom, and at least one of $R^d$ to $R^f$ represent a hydrogen atom. Further, the alkyl group is preferably a methyl group.

The metallocene complex represented by the general formula (II) contains a silyl ligand [—SiX'$_3$]. X' contained in the silyl ligand [—SiX'$_3$] is a group defined in a manner similar to X in the general formula (III) as described below, and the preferred groups are also the same as those of X in the general formula (III).

In the general formula (III), X represents a group selected from the group consisting of a hydrogen atom, a halogen atom, an alkoxide group, a thiolate group, an amide group, a silyl group, and a hydrocarbon group having 1 to 20 carbon atoms. Examples of the alkoxide group include aliphatic alkoxy groups such as a methoxy group, an ethoxy group, a propoxy group, a n-butoxy group, an isobutoxy group, a sec-butoxy group, and a tert-butoxy group; and aryl oxide groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group. Among the above, a 2,6-di-tert-butylphenoxy group is preferable.

In the general formula (III), examples of the thiolate group represented by X include aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and arylthiolate groups such as a thiophenoxy group, a 2,6-di-tert-butylthiophenoxy group, a 2,6-diisopropylthiophenoxv group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group. Among the above, a 2,4,6-triisopropylthiophenoxy group is preferable.

In the general formula (III), examples of the amide group represented by X include aliphatic amide groups such as a dimethylamide group, a diethylamide group, and a diisopropylamide group; arylamide groups such as a phenylamide group, a 2,6-di-tert-butylphenylamide group, a 2,6-diisopropylphenylamide group, a 2,6-dineopentylphenylamide group, a 2-tert-butyl-6-isopropylphenylamide group, a 2-tert-butyl-6-neopentylphenylamide group, a 2-isopropyl-6-neopentylphenylamide group, and a 2,4,6-tri-tert-butylphenylamide group; and bistrialkylsilylamide groups such as a bistrimethylsilylamide group. Among the above, a bistrimethylsilylamide group is preferable.

In the general formula (III), examples of the silyl group represented by X include a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group. Among the above, a tris(trimethylsilyl)silyl group is preferable.

In the general formula (III), the halogen atom represented by X may be any one of a fluorine atom, a chlorine atom, a bromine atom and an iodine atom, and is preferably a chlorine atom or a bromine atom. In addition, specific examples of the hydrocarbon group having 1 to 20 carbon atoms represented by X include linear or branched aliphatic hydrocarbon groups such as a methyl group, an ethyl group, a n-propyl group, an isopropyl group, a n-butyl group, an isobutyl group, a sec-butyl group, a tert-butyl group, a neopentyl group, a hexyl group, and an octyl group: aromatic hydrocarbon groups such as a phenyl group, a tolyl group, and a naphthyl group; aralkyl groups such as a benzyl group; and hydrocarbon groups containing silicon atoms such as a trimethylsilylmethyl group and a bistrimethylsilylmethyl group. Among the above, preferred examples include a methyl group, an ethyl group, an isobutyl group, and a trimethylsilylmethyl group.

In the general formula (III), X preferably represents a bistrimethylsilylamide group or a hydrocarbon group having 1 to 20 carbon atoms.

In the general formula (III), examples of the non-coordinating anion represented by [B]$^-$ include a tetravalent boron anion. Specific examples of the tetravalent boron anion include a tetraphenylborate, a tetrakis(monofluorophenyl)borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (triphenylpentafluorophenyl)borate, a [tris(pentafluorophenyl)phenyl]borate, and a tridecahydride-7,8-dicarbaundecaborate. Among the above, a tetrakis(pentafluorophenyl)borate is preferable.

The metallocene complexes represented by the general formulae (I) and (II) and the half metallocene cation complex represented by the general formula (III) further contain 0 to 3, preferably 0 or 1, neutral Lewis bases L. Examples of the neutral Lewis base L include tetrahydrofuran, diethylether, dimethylaniline, trimethylphosphine, lithium chloride, neutral olefins, and neutral diolefins. When the complexes contain a plurality of neutral Lewis bases L, each neutral Lewis base L may be the same as or different from each other.

The metallocene complexes represented by the general formulae (I) to (II) and the half metallocene cation complex represented by the general formula (III) may be present as a monomer or as a dimer or a multimer having two or more monomers.

The metallocene complex represented by the general formula (I) can be obtained, for example, by reacting lanthanoid trishalide, scandium trishalide or yttrium trishalide with salts of indenyl (for example, potassium salts or lithium salts) and salts of bis(trialkylsilyl)amide (for example, potassium salts or lithium salts) in a solvent. The reaction temperature may be about room temperature, so that the complex can be produced under mild conditions. The reaction time is not particularly limited, and may be about several hours to several tens of hours. The reaction solvent is not particularly limited. The solvent is preferably one that dissolves the raw materials and products, and examples thereof include toluene. The following illustrates an example of the reaction for obtaining the metallocene complex represented by the general formula (I):

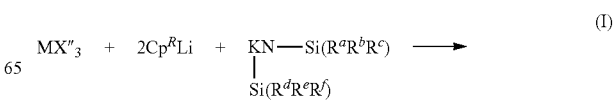

-continued

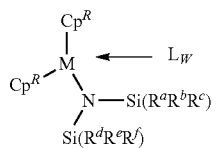

(where X" represents a halide).

The metallocene complex represented by the general formula (II) can be obtained, for example, by reacting lanthanoid trishalide, scandium trishalide or yttrium trishalide with salts of indenyl (for example, potassium salts or lithium salts) and salts of silyl (for example, potassium salts or lithium salts) in a solvent. The reaction temperature may be about room temperature, so that the complex can be produced under mild conditions. The reaction time is not particularly limited, and may be about several hours to several tens of hours. The reaction solvent is not particularly limited. The solvent is preferably one that dissolves the raw materials and products, and examples thereof include toluene. The following illustrates an example of the reaction for obtaining the metallocene complex represented by the general formula (II):

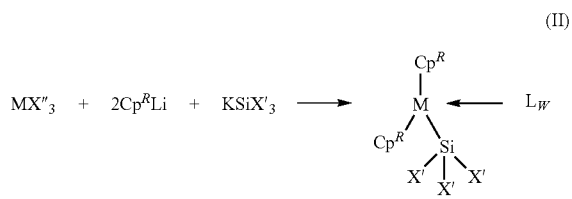

(where X" represents a halide).

The half metallocene cation complex represented by the general formula (III) can be obtained, for example, by the following reaction.

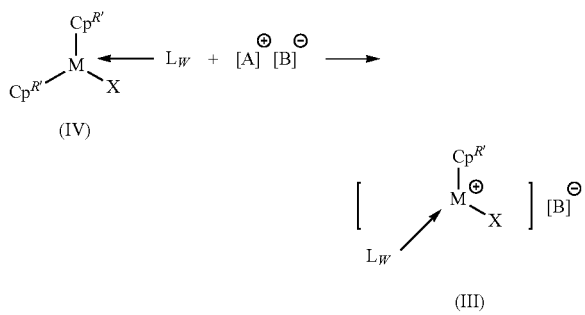

In the compound represented by the general formula (IV), M represents a lanthanoid element, scandium or yttrium; each $Cp^{R'}$ independently represents a substituted cyclopentadienyl, a substituted indenyl, or a substituted fluorenyl; X represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3. In the ionic compound represented by the general formula $[A]^+[B]^-$, $[A]^+$ represents a cation, and $[B]^-$ represents a non-coordinating anion.

Examples of the cation represented by $[A]^+$ include a carbonium cation, an oxonium cation, an amine cation, a phosphonium cation, a cycloheptatrienyl cation, and a ferrocenium cation having a transition metal. Examples of the carbonium cation include trisubstituted carbonium cations such as a triphenylcarbonium cation and a tri(substituted phenyl)carbonium cation. Specific examples of the tri(substituted phenyl)carbonium cation include a tri(methylphenyl)carbonium cation. Examples of the amine cation include trialkylammonium cations such as a trimethylammonium cation, a triethylammonium cation, a tripropylammonium cation, and a tributylammonium cation: N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri(dimethylphenyl)phosphonium cation. Among the above cations, a N,N-dialkylanilinium cation or a carbonium cation is preferable, and a N,N-dialkylanilinium cation is particularly preferable.

The ionic compound represented by the general formula $[A]^+[B]^-$ used in the reaction is preferably a compound obtained by selecting from the above-mentioned non-coordinating anions and cations respectively and combining them, such as a N,N-dimethylanilinium tetrakis(pentafluorophenyl)borate, or a triphenylcarbonium tetrakis(pentafluorophenyl)borate. The ionic compound represented by the general formula $[A]^+[B]^-$ is preferably added in an amount of 0.1-fold mol to 10-fold mol and more preferably added in an amount of about 1-fold mol with respect to the metallocene complex. When the half metallocene cation complex represented by the general formula (III) is used in a polymerization reaction, the half metallocene cation complex represented by the general formula (III) may be directly supplied to the polymerization system, or alternatively, the compound represented by the general formula (IV) and the ionic compound represented by the general formula $[A]^+$$[B]^-$ to be used in the reaction may be separately supplied to the polymerization system to form the half metallocene cation complex represented by the general formula (III) in the reaction system. In addition, the half metallocene cation complex represented by the general formula (III) may be formed in the reaction system by using the metallocene complex represented by the general formula (I) or (II) and the ionic compound represented by the general formula $[A]^+[B]^-$ in combination.

Structures of the metallocene complexes represented by the general formulae (I) and (II) and the half metallocene cation complex represented by the general formula (III) is preferably determined by X-ray crystallography.

The co-catalyst that can be used in the polymerization catalyst composition may optionally be selected from components used as a co-catalyst of a general polymerization catalyst composition containing a metallocene complex. Preferred examples of the co-catalyst include aluminoxane, an organic aluminum compound, and the above-mentioned ionic compounds. These co-catalysts may be used alone or in a combination of two or more.

The aluminoxane is preferably alkylaminoxane, and examples thereof include methylaluminoxane (MAO) and modified methylaluminoxane. Preferred examples of the modified methylaluminoxane include MMAO-3A (produced by Tosoh Finechem Corporation). The aluminoxane contained in the second polymerization catalyst composition is preferably in an amount of about 10 to 1.000 and more preferably in an amount of about 100 at an element ratio (Al/M) of the aluminum element Al of the aluminoxane to the central metal M of the metallocene complex.

On the other hand, the organic aluminum compound is preferably an organic aluminum compound represented by a general formula of AlRR'R" (where R and R' each independently represent a hydrocarbon group having 1 to 10 carbon atoms or a hydrogen atom, and R" is a hydrocarbon group having 1 to 10 carbon atoms). Examples of the organic aluminum compound include trialkylaluminum, a dialkylaluminum chloride, an alkylaluminum dichloride, and a dialkylaluminum hydride. Among the above, trialkylaluminum is preferable. Examples of the trialkylaluminum include triethylaluminum and triisobutylaluminum. The organic aluminum compound is preferably contained in the polymerization catalyst composition in an amount of 1-fold mol to 50-fold mol and more preferably in an amount of about 10-fold mol with respect to the metallocene complex.

In the polymerization catalyst composition, the metallocene complexes represented by the general formulae (I) and (II) and the half metallocene cation complex represented by the general formula (III) may be combined with an appropriate co-catalyst respectively to increase the cis-1,4 bond content and the molecular weight of the obtained polymer.

Figure 2:
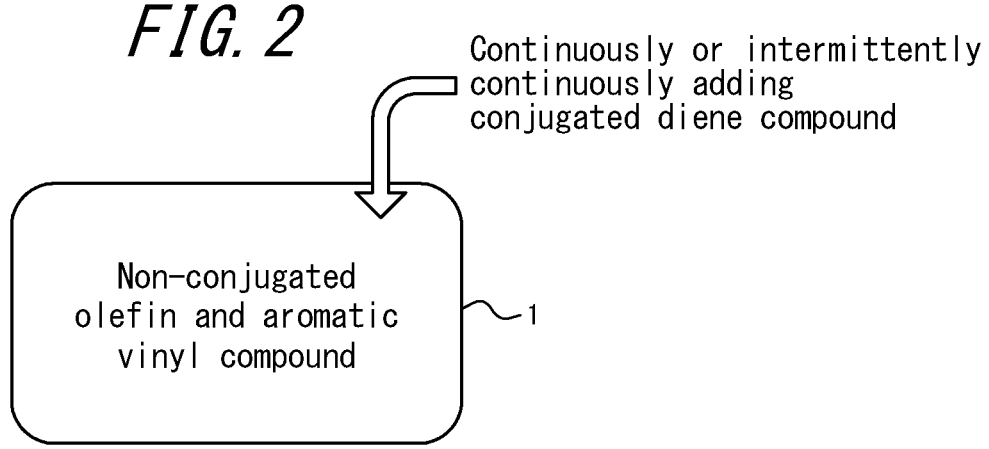
FIG. 2 schematically illustrates another example of the method for producing a multicomponent copolymer of the present disclosure.

In the method of the present disclosure, the reactor preferably contains the non-conjugated olefin compound and the aromatic vinyl compound before continuously or intermittently continuously adding the conjugated diene compound. This further increases the rupture strength and breaking elongation of the obtained multicomponent copolymer. FIG. 2 schematically illustrates another example of the method of the present disclosure. In FIG. 2, the reactor 1 contains a non-conjugated olefin compound and an aromatic vinyl compound, and a conjugated diene compound is continuously or intermittently continuously added into the reactor 1.

In the method of the present disclosure, the reactor preferably further contains the conjugated diene compound before continuously or intermittently continuously adding the conjugated diene compound. This improves the polymerization activity and the yield, that is, improves the productivity. In this case, the amount of the conjugated diene compound contained in the reactor is preferably 0.001 mol to 1 mol, or 10% or less of the total amount of the conjugated diene compound used.

Figure 3:
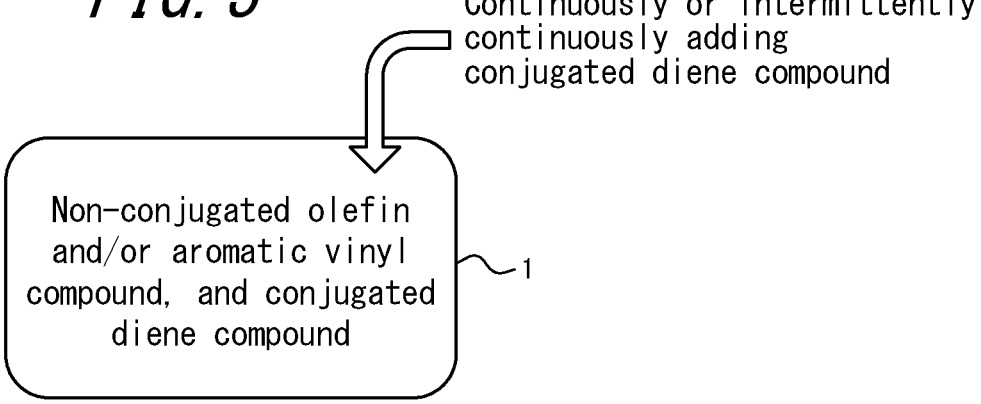
FIG. 3 schematically illustrates another example of the method for producing a multicomponent copolymer of the present disclosure.

FIG. 3 schematically illustrates another example of the method of the present disclosure. In FIG. 3, the reactor 1 contains a conjugated diene compound and at least one selected from the group consisting of a non-conjugated olefin compound and an aromatic vinyl compound, and a conjugated diene compound is continuously or intermittently continuously added into the reactor 1.

The method of the present disclosure preferably comprises the step of adding at least one selected from the group consisting of the non-conjugated olefin compound and the aromatic vinyl compound into the reactor.

Figure 4:
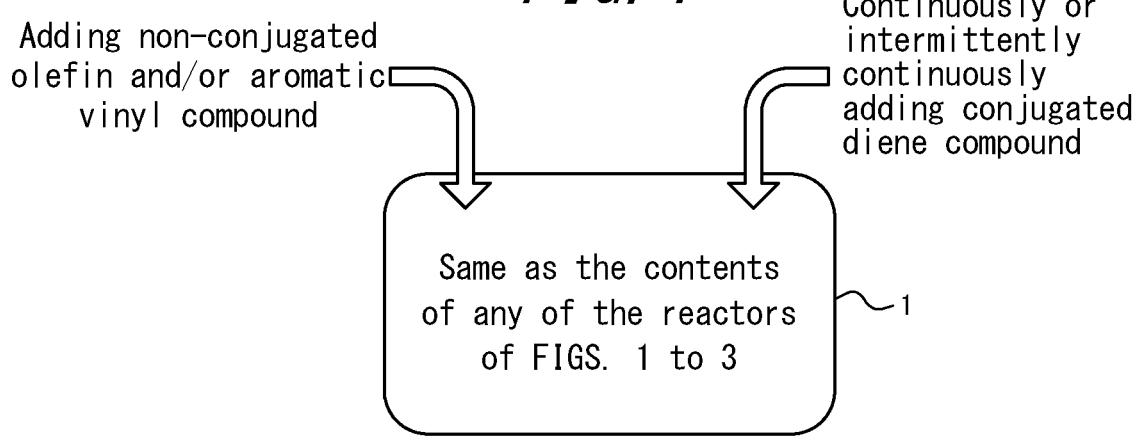
FIG. 4 schematically illustrates another example of the method for producing a multicomponent copolymer of the present disclosure.

FIG. 4 schematically illustrates another example of the method of the present disclosure. In FIG. 4, a conjugated diene compound is continuously or intermittently continuously added into the reactor 1. In addition, the method comprises the step of adding at least one selected from the group consisting of a non-conjugated olefin compound and an aromatic vinyl compound into the reactor. The contents of the reactor 1 are the same as the contents of any of the reactors of FIGS. 1 to 3.

When the aromatic vinyl compound is added in the step of adding at least one selected from the group consisting of the non-conjugated olefin compound and the aromatic vinyl compound, the concentration of the aromatic vinyl compound to be added may be appropriately selected, and may be, for example, 10 wt. % to 100 wt. %. In the case of 100 wt. %, the aromatic vinyl compound is added alone without diluting it with a solvent.

The solvent may be appropriately selected from known solvents used in the polymerization of aromatic vinyl compounds. Examples of the solvent include toluene, cyclohexane, and n-hexane.

In the method of the present disclosure, it is preferable that
  the total amount of the non-conjugated olefin compound used be 40 mol % to 99.8 mol %,
  the total amount of the aromatic vinyl compound used be 0.1 mol % to 30 mol %, and
  the total amount of the conjugated diene compound used be 0.01 mol % to 30 mol %, with respect to the total amount of the non-conjugated olefin compound, aromatic vinyl compound and conjugated diene compound used. Thereby, the non-conjugated olefin unit, aromatic vinyl unit and conjugated diene unit are contained in preferable amounts in the multicomponent copolymer.

When the step of adding at least one selected from the group consisting of the non-conjugated olefin compound and the aromatic vinyl compound is carried out, the order of this step and the step of adding continuously or intermittently continuously a conjugated diene compound is not particularly limited. This step may be carried out at the same time as the step of adding continuously or intermittently continuously a conjugated diene compound, or may be carried out before or after the step of adding continuously or intermittently continuously a conjugated diene compound.

In the step of adding at least one selected from the group consisting of the non-conjugated olefin compound and the aromatic vinyl compound, the method of adding the compound is not particularly limited. It may be added continuously or intermittently continuously, or may be added in divided portions. The concentration of the compound to be added may be appropriately adjusted. The concentration may be uniform during the polymerization, or may be varied as the polymerization time increases.

The polymerization method of the multicomponent copolymer may be any method, such as solution polymerization, suspension polymerization, liquid phase bulk polymerization, emulsion polymerization, vapor phase polymerization, and solid phase polymerization.

The polymerization reaction is preferably performed in an inert gas atmosphere, and more preferably in an atmosphere of nitrogen gas or argon gas.

The polymerization temperature of the polymerization reaction is not particularly limited, and may be, for example, −100° C. to 200° C. or room temperature (25° C.) to 100° C., or about room temperature.

The polymerization reaction is preferably performed under pressure in a range of 0.1 MPa to 10.0 MPa so as to allow the conjugated diene compound to be sufficiently introduced into the polymerization reaction system.

The polymerization may be stopped by a terminator such as methanol, ethanol, and isopropanol.

The method of the present disclosure may comprise the step of coupling in which a reaction (coupling reaction) is performed to modify at least a part (for example, a terminal end) of the polymer chain of the obtained multicomponent copolymer. In the step of coupling, the coupling reaction is preferably performed when the polymerization reaction has reached 100%.

The coupling agent used in the coupling reaction is not particularly limited, and may be appropriately selected depending on the intended use. The coupling agent may be used alone or in a combination of two or more. Examples of the coupling agent include a tin-containing compound such as bis(maleic acid-1-octadecyl)dioctyltin(IV); an isocyanate compound such as 4,4'-diphenylmethane diisocyanate; and an alkoxysilane compound such as glycidylpropyltrimethoxysilane. Among the above, bis(maleic acid-1-octadecyl) dioctyltin(IV) is preferable because of its high reaction efficiency and low gel-formation property. The coupling reaction thus performed may increase the number-average molecular weight (Mn).

In order to reduce the amount of catalyst residues in the multicomponent copolymer, the method of the present disclosure may comprise the step of cleaning in which the multicomponent copolymer obtained in the multicomponent copolymer polymerization is cleaned with a solvent. The solvent used in the cleaning is not particularly limited and may be appropriately selected depending on the intended use. Examples of the solvent include methanol, ethanol, and isopropanol.

In the case of using a catalyst derived from a Lewis acid as the polymerization catalyst, an acid (for example, hydrochloric acid, sulfuric acid, nitric acid, etc.) can be added to the solvent used in cleaning. The amount of acid to be added is preferably 15 mol % or less with respect to the solvent from the viewpoint of reducing the residual amount of acid and not adversely affecting the reaction during kneading and vulcanization of the rubber composition.

(Multicomponent Copolymer)

The multicomponent copolymer of the present disclosure is obtained with any of the above-described production methods. The present disclosure can provide a multicomponent copolymer having excellent rupture strength.

Further, for the multicomponent copolymer of the present disclosure, it is preferable that the peak top molecular weight of the chain moiety containing the non-conjugated olefin unit and/or the aromatic vinyl unit, which is divided by the conjugated diene unit, be 1,000 to 40,000. Although the details of excellent low heat generating property and wear resistance are not clear, it is presumed that when the peak top molecular weight is 1,000 to 40,000, the micro-entanglement of molecular chains in the rubber composition is increased, thereby reducing the overall rubber loss, enhancing the reinforcement, and distributing the stress concentration. The "chain moiety containing the non-conjugated olefin unit and/or the aromatic vinyl unit, which is divided by the conjugated diene unit" (hereinafter may be simply referred to as "chain moiety") herein is a chain moiety remaining when all the conjugated diene units are removed from the multicomponent copolymer, meaning a moiety containing two or more units selected from the non-conjugated olefin units and the aromatic vinyl units.

The chain moiety can be obtained by washing a mixture, which is obtained by ozonolysis of the multicomponent copolymer, with e.g., alcohol and drying it. The conjugated diene unit is decomposed in the ozonolysis, and removed as a low molecular weight component soluble in alcohol. In this way, it is possible to keep the chain moiety and remove the conjugated diene unit. The peak top molecular weight (Mp) and weight-average molecular weight (Mw) of the chain moiety (mixture), and the molecular weight of each one of the chain moiety can be determined by gel permeation chromatography (GPC) using polystyrene as a standard substance. The "peak top molecular weight (Mp)" is a molecular weight obtained from the position of the apex of the peak of the molecular weight distribution obtained by GPC.

The content of the chain moiety in the multicomponent copolymer is preferably 5 mass % or more. When the content of the chain moiety is 5 mass % or more, the micro-entanglement of the chain moiety can be ensured, and at the same time, the compatibility with diene rubbers by the conjugated diene unit and the dispersion of filler can be sufficiently guaranteed. Thereby, the low heat generating property and wear resistance can be further improved. The content of the chain moiety is the amount of the non-conjugated olefin unit and/or the aromatic vinyl unit constituting the chain in the whole polymer. From the viewpoint of further improving the low heat generating property and wear resistance, the content of the chain moiety is more preferably 5 mass % to 90 mass %, and still more preferably 5 mass % to 50 mass %.

For the multicomponent copolymer, it is preferable that 40 mass % or more of the chain moiety have a molecular weight of 1,000 to 40,000. Thereby, the micro-entanglement of molecular chains of the chain moiety is further increased, and the low heat generating property and wear resistance can be further improved. From the viewpoint of further improving the low heat generating property and wear resistance, it is more preferable that 40 mass % to 100 mass % of the chain moiety have a molecular weight of 1,000 to 40,000, and particularly preferable that 45 mass % to 100 mass % of the chain moiety have a molecular weight of 1,000 to 40,000. The ratio of those having a molecular weight of 1,000 to 40,000 in the chain moiety can be calculated from a peak area corresponding to a molecular weight in the range of 1,000 to 40,000 in terms of polystyrene as a standard substance, based on a GPC curve diagram obtained by gel permeation chromatography (GPC).

The conjugated diene unit in the multicomponent copolymer preferably comprises at least one selected from the group consisting of a butadiene unit and an isoprene unit, more preferably is at least one selected from the group consisting of a butadiene unit and an isoprene unit, and still more preferably consists only of a butadiene unit.

The content of the conjugated diene unit in the multicomponent copolymer is not particularly limited, but is preferably 1 mol % to 20 mol %. When the content of the conjugated diene unit is 1 mol % to 20 mol %, the micro-entanglement of molecular chains can be ensured, and at the same time, the compatibility with diene rubbers by the conjugated diene unit and the dispersion of filler can be sufficiently guaranteed. Thereby, the low heat generating property and wear resistance can be further improved, and the compatibility with general-purpose rubbers such as BR and NR is improved. From the viewpoint of improving the low heat generating property, wear resistance, and compatibility, it is more preferably 3 mol % to 20 mol %.

The non-conjugated olefin unit in the multicomponent copolymer is preferably an acyclic non-conjugated olefin unit. The acyclic non-conjugated olefin unit is more preferably an α-olefin unit, further preferably an α-olefin unit containing an ethylene unit, and still more preferably consists only of an ethylene unit.

The content of the non-conjugated olefin unit in the multicomponent copolymer is not particularly limited, and is preferably 60 mol % or more. When the content of the non-conjugated olefin unit is 60 mol % or more, the content of the chain moiety in the multicomponent copolymer and the content of those having a molecular weight of 1,000 to 40,000 in the chain moiety can be optimized, and the low heat generating property and wear resistance can be improved. From the viewpoint of improving the low heat generating property and wear resistance, the content of the non-conjugated olefin unit is more preferably 60 mol % to 96 mol %, and particularly preferably 65 mol % to 90 mol %.

The aromatic vinyl unit in the multicomponent copolymer preferably comprises a styrene unit, and more preferably consists only of a styrene unit.

The content of the aromatic vinyl unit in the multicomponent copolymer is not particularly limited, and is preferably 3 mol % or more. When the content is 3 mol % or more, the content of the chain moiety and the content of those having a molecular weight of 1,000 to 40,000 in the chain moiety can be optimized, the rollability and wear resistance can be improved, and the compatibility with general-purpose rubbers such as SBR is improved. From the viewpoint of improving the low heat generating property, wear resistance and compatibility, the content of the aromatic vinyl unit is more preferably 3 mol % to 20 mol %, and particularly preferably 5 mol % to 15 mol %.

For the multicomponent copolymer of the present disclosure, it is preferable that
the content of the conjugated diene unit in the multicomponent copolymer be 1 mol % to 20 mol %,
the content of the non-conjugated olefin unit in the multicomponent copolymer be 60 mol % to 96 mol %, and
the content of the aromatic vinyl unit in the multicomponent copolymer be 3 mol % to 20 mol %. Thereby, the low heat generating property, wear resistance, and the compatibility with general-purpose rubbers can be improved.

The weight-average molecular weight (Mw) of the multicomponent copolymer is not particularly limited. The Mw is preferably 10,000 to 10,000,000, more preferably 100,000 to 9,000,000, and particularly preferably 150,000 to 8,000,000. When the Mw is 10,000 or more, the mechanical strength as a rubber article material can be sufficiently ensured. When the Mw is 10,000,000 or less, it is possible to maintain high operability. From the viewpoint of sufficiently ensuring the mechanical strength as a rubber article material and maintaining high operability, the Mw is preferably 100,000 to 9,000,000, and more preferably 150,000 to 8,000,000.

Further, the molecular weight distribution (Mw/Mn), represented by the ratio of weight-average molecular weight (Mw) to number average molecular weight (Mn), of the multicomponent copolymer is preferably 10.0 or less, more preferably 9.0 or less, and particularly preferably 8.0 or less. In addition, Mw/Mn is preferably 6 or less, 5 or less, 4 or less, or 3 or less. A molecular weight distribution of 10.0 or less can provide sufficient homogeneity to the physical properties of the multicomponent copolymer. The weight average molecular weight and the molecular weight distribution are obtained by gel permeation chromatography (GPC) using polystyrene as a standard substance.

In the rubber composition of the present disclosure, the endothermic peak energy of the multicomponent copolymer (a1) measured by a differential scanning calorimeter (DSC) at 0° C. to 120° C. is preferably 10 J/g to 150 J/g, and more preferably 30 J/g to 120 Jig. When the endothermic peak energy of the multicomponent copolymer (a1) is 10 J/g or more, the crystallinity of the multicomponent copolymer (a1) is increased and the crack resistance of the rubber composition is further improved. In addition, when the endothermic peak energy of the multicomponent copolymer (a1) is 150 J/g or less, the operability of the rubber composition is further improved. The endothermic peak energy herein is a value measured with the method described in the EXAMPLES section.

The arrangement of the conjugated diene unit, the non-conjugated olefin unit, and the aromatic vinyl unit in the multicomponent copolymer is not particularly limited, and may be, for example, random copolymerization, block copolymerization, or graft copolymerization.

(Rubber Composition)

The rubber composition of the present disclosure comprises the above-described multicomponent copolymer as a rubber component. The present disclosure can provide a rubber composition having excellent rupture strength.

The rubber composition of the present disclosure may or may not comprise other rubber components in addition to the multicomponent copolymer. The other rubber components may be appropriately selected from known rubber components. Examples thereof include a natural rubber, a butadiene rubber, a styrene-butadiene copolymer rubber, an isoprene rubber, a butyl rubber, a bromide of a copolymer of isobutylene and p-methylstyrene, a halogenated butyl rubber, an acrylonitrile-butadiene rubber, a chloroprene rubber, an ethylene-propylene copolymer rubber, an ethylene-propylene-diene copolymer rubber, a styrene-isoprene copolymer rubber, a styrene-isoprene-butadiene copolymer rubber, an isoprene-butadiene copolymer rubber, chlorosulfonated polyethylene, an acrylic rubber, an epichlorohydrin rubber, a polysulfide rubber, a silicone rubber, a fluororubber, and a urethane rubber. These other rubber components may be used alone or in a combination of two or more.

The rubber composition of the present disclosure may be suitably compounded with a well-known additive compounded in rubber compositions. Examples of the additive include a filler, a crosslinking agent, a vulcanization accelerator, an age resistor, a reinforcing agent, a softening agent, a vulcanizing co-agent, a colorant, a flame retardant, a lubricant, a foaming agent, a plasticizer, a processing aid, an antioxidant, an anti-scorch agent, an ultraviolet rays protecting agent, an antistatic agent, a color protecting agent, and oil. Each additive may be used alone or in a combination of two or more.

The rubber composition may optionally comprise a filler. The filler may be used alone or in a combination of two or more.

The filler is not particularly limited, and may be any known filler. Examples thereof include carbon black, silica, aluminum hydroxide, clay, alumina, talc, mica, kaolin, glass balloon, glass beads, calcium carbonate, magnesium carbonate, magnesium hydroxide, magnesium oxide, titanium oxide, potassium titanate, and barium sulfate. Among the above, carbon black is preferable.

Examples of the carbon black include FEF, GPF, SRF, HAF, N339. IISAF, ISAF, and SAF.

The nitrogen absorption specific surface area ($N_2SA$, measured according to JIS K 6217-2:2001) is not particularly limited and may be appropriately selected depending on the intended use. For example, $N_2SA$ may be 20 $m^2/g$ or more or 35 $m^2/g$ or more, and 200 $m^2/g$ or less or 100 $m^2/g$ or less.

The content of the filler in the rubber composition is not particularly limited, and may be appropriately selected depending on the intended use. For example, the content may be 10 parts by mass to 100 parts by mass, 20 parts by mass to 80 parts by mass, or 30 parts by mass to 60 parts by mass with respect to 100 parts by mass of the rubber component.

The crosslinking agent is not particularly limited, and may be appropriately selected from known crosslinking agents depending on the intended use. Examples thereof include a sulfur-based crosslinking agent, an organic peroxide-based crosslinking agent, an inorganic crosslinking agent, a polyamine crosslinking agent, a resin crosslinking agent, a sulfur compound-based crosslinking agent, and an oxime-nitrosamine-based crosslinking agent. Among the above, a sulfur-based crosslinking agent (vulcanizing agent) is preferable for a rubber composition used in tires.

The content of the crosslinking agent in the rubber composition is not particularly limited, and may be appropriately selected depending on the intended use. For example, the content may be 0.1 parts by mass to 20 parts by mass with respect to 100 parts by mass of the rubber component.

In the case of using a sulfur-based crosslinking agent (vulcanizing agent), a vulcanization accelerator may also be used. Examples of the vulcanization accelerator include a guanidine-based compound, an aldehyde-amine-based compound, an aldehyde-ammonia-based compound, a thiazole-based compound, a sulfenamide-based compound, a thiourea-based compound, a thiuram-based compound, a dithiocarbamate-based compound, and a xanthate-based compound.

(Crosslinked Rubber Composition)

The rubber composition of the present disclosure can be crosslinked to obtain a crosslinked rubber composition. The crosslinked rubber composition is derived from the multi-component copolymer of the present disclosure, and therefore has excellent rupture strength.

The crosslinking conditions are not particularly limited, and may be appropriately selected depending on the intended use. For example, the heating temperature may be 120° C. to 200° C., and the heating time may be 1 minute to 900 minutes.

(Rubber Article)

A rubber article using the rubber composition of the present disclosure or containing the above-described crosslinked rubber composition has excellent rupture strength.

The rubber article is not particularly limited, and examples thereof include a tire; an anti-vibration rubber; a seismic isolation rubber: a belt such as a conveyor belt; a rubber crawler: and various hoses.

(Tire)

The tire of the present disclosure uses the above-described rubber composition. The present disclosure can provide a tire having excellent rupture strength. The application of the rubber composition or the crosslinked rubber composition in the tire is not particularly limited, and may be appropriately selected depending on the intended use. For example, it may be applied as a tread rubber, a base tread rubber, a sidewall rubber, a side reinforcing rubber, or a bead filler.

EXAMPLES

The present disclosure will now be described based on Examples, which are illustrative purposes only and shall not be construed as limiting the scope of the present disclosure.

Details of materials used in Examples are as follows.
Silica: trade name "NipSil AQ", manufactured by Tosoh Silica Corporation Silane coupling agent: trade name "ABC-856", manufactured by Shin-Etsu Chemical Co., Ltd.
Oil: trade name "JOMO PROCESS NC300BN", manufactured by JX Nippon Oil & Energy Corporation
WAX: trade name "SUNTIGHT® A" (SUNTIGHT is a registered trademark in Japan, other countries, or both), manufactured by Seiko-Chemical Co., Ltd.
Age resistor: N-(1,3-dimethylbutyl)-N'-phenyl-p-phenylenediamine, trade name "NOCRAC 6C", manufactured by Ouchi Shinko Chemical Industrial Co., Ltd.
Vulcanization accelerator 1: 1,3-diphenylguanidine, trade name "NOCCELER D", manufactured by Ouchi Shinko Chemical Industrial Co., Ltd. Vulcanization accelerator 2: bis(2-benzothiazolyl)persulfide, trade name "NOCCELER DM-P", manufactured by Ouchi Shinko Chemical Industrial Co., Ltd.
Vulcanization accelerator 3: N-(tert-butyl)-2-benzothiazole-sulfenamide, trade name "NOCCELER NS-P", manufactured by Ouchi Shinko Chemical Industrial Co., Ltd.

Comparative Example 1

A 2000 mL pressure-resistant stainless steel reactor was sufficiently dried, and 75 g of styrene, 80 g of a toluene solution containing 20 g of 1,3-butadiene, and 675 g of toluene were added into the reactor.

In addition, 0.075 mmol of ((1-benzyldimethylsilyl-3-methyl)indenyl) bis(bis(dimethylsilyl)amido) gadolinium complex 1-Benzyldimethyl-3-MethylSi]$_2$CH$_5$Gd[N(SiHMe$_2$)$_2$], 0.083 mmol of dimethylanilinium tetrakis(pentafluorophenyl)borate [Me$_2$NHPhB(C$_6$F$_5$)$_4$], and 0.35 mmol of diisobutylaluminum hydride were added to a glass container in a glove box under a nitrogen atmosphere, and 30 g of toluene was further added to obtain a catalyst solution. The catalyst solution was added into the pressure-resistant stainless steel reactor and heated to 75° C.

Next, ethylene was charged into the pressure-resistant stainless steel reactor at a pressure of 1.5 MPa, and copolymerization was performed at 75° C. for a total of 4 hours.

Next, 1 mL of an isopropanol solution of 5 mass % of 2,2'-methylene-bis (4-ethyl-6-t-butylphenol) (NS-5) was added into the pressure-resistant stainless steel reactor to stop the reaction. Next, a large amount of methanol was used to separate a copolymer, and the copolymer was vacuum dried at 50° C. to obtain Copolymer a.

Example 1

A 2000 mL pressure-resistant stainless steel reactor was sufficiently dried, and 75 g of styrene and 675 g of toluene were added into the reactor.

In addition, 0.075 mmol of ((1-benzyldimethylsilyl-3-methyl)indenyl) bis(bis(dimethylsilyl)amido) gadolinium complex 1-Benzyldimethyl-3-MethylSi]$_2$C$_9$H$_5$Gd[N(SiHMe$_2$)$_2$], 0.083 mmol of dimethylanilinium tetrakis(pentafluorophenyl)borate [Me$_2$NHPhB(C$_6$F$_5$)$_4$], and 0.35 mmol of diisobutylaluminum hydride were added to a glass container in a glove box under a nitrogen atmosphere, and 30 g of toluene was further added to obtain a catalyst solution. The catalyst solution was added into the pressure-resistant stainless steel reactor and heated to 60° C.

Next, ethylene was charged into the pressure-resistant stainless steel reactor at a pressure of 1.5 MPa, and copolymerization was performed at 75° C. for a total of 4 hours. During the copolymerization, 80 g of a toluene solution containing 20 g of 1,3-butadiene was continuously added at a rate of 0.3 mL to 0.4 mL per minute.

Next, 1 mL of an isopropanol solution of 5 mass % of 2,2'-methylene-bis (4-ethyl-6-t-butylphenol) (NS-5) was added into the pressure-resistant stainless steel reactor to stop the reaction. Next, a large amount of methanol was used to separate a copolymer, and the copolymer was vacuum dried at 50° C. to obtain Copolymer A.

Example 2

A 2000 mL pressure-resistant stainless steel reactor was sufficiently dried, and 75 g of styrene, 20 g of a toluene solution containing 5 g of 1,3-butadiene, and 413 g of toluene were added into the reactor.

In addition, 0.075 mmol of mono(bis(1,3-tert-butyldimethylsilyl)indenyl) bis(bis(dimethylsilyl)amido) gadolinium complex 1,3-[(t-Bu)Me$_2$Si]$_2$C$_9$H$_5$Gd[N(SiHMe$_2$)$_2$], 0.075 mmol of dimethylanilinium tetrakis(pentafluorophenyl)borate [Me$_2$NHPhB(C$_6$F$_5$)$_4$], and 0.35 mmol of diisobutylaluminum hydride were added to a glass container in a glove box under a nitrogen atmosphere, and 20 mL of toluene was further added to obtain a catalyst solution. The catalyst solution was added into the pressure-resistant stainless steel reactor and heated to 60° C.

Next, ethylene was charged into the pressure-resistant stainless steel reactor at a pressure of 1.5 MPa. and copolymerization was performed at 75° C. for a total of 4 hours. During the copolymerization, 58 g of a toluene solution containing 20 g of 1,3-butadiene was continuously added at a rate of 0.3 mL to 0.4 mL per minute.

Next, 1 mL of an isopropanol solution of 5 mass % of 2,2'-methylene-bis (4-ethyl-6-t-butylphenol) (NS-5) was added into the pressure-resistant stainless steel reactor to stop the reaction. Next, a large amount of methanol was used to separate a copolymer, and the copolymer was vacuum dried at 50° C. to obtain Copolymer B.

Example 3

A 2000 mL pressure-resistant stainless steel reactor was sufficiently dried, and 89 g of styrene, 14 g of a toluene solution containing 3.5 g of 1,3-butadiene, and 597 g of toluene were added into the reactor.

In addition, 0.0375 mmol of mono(bis(1,3-tert-butyldimethyl silyl)indenyl) bis(bis(dimethylsilyl)amido) gadolinium complex 1,3-[(t-Bu)Me$_2$Si]$_2$C$_9$H$_5$Gd[N(SiHMe$_2$)$_2$], 0.0375 mmol of dimethylanilinium tetrakis(pentafluorophenyl)borate [Me$_2$NHPhB(C$_6$F$_5$)$_4$], and 0.75 mmol of triisobutylaluminum were added to a glass container in a glove box under a nitrogen atmosphere, and 10 mL of toluene was further added to obtain a catalyst solution. The catalyst solution was added into the pressure-resistant stainless steel reactor and heated to 60° C.

Next, ethylene was charged into the pressure-resistant stainless steel reactor at a pressure of 1.5 MPa, and copolymerization was performed at 85° C. for a total of 4 hours. During the copolymerization, 58 g of a toluene solution containing 14 g of 1,3-butadiene was continuously added at a rate of 0.3 mL to 0.4 mL per minute.

Next, 1 mL of an isopropanol solution of 5 mass % of 2,2'-methylene-bis (4-ethyl-6-t-butylphenol) (NS-5) was added into the pressure-resistant stainless steel reactor to stop the reaction. Next, a large amount of methanol was used to separate a copolymer, and the copolymer was vacuum dried at 50° C. to obtain Copolymer C.

Example 4

A 2000 mL pressure-resistant stainless steel reactor was sufficiently dried, and 145 g of styrene and 597 g of toluene were added into the reactor.

In addition, 0.150 mmol of mono(bis(1,3-tert-butyldimethylsilyl)indenyl) bis(bis(dimethylsilyl)amido) gadolinium complex 1,3-[(t-Bu)Me$_2$Si]$_2$C$_9$H$_5$Gd[N(SiHMe$_2$)$_2$], 0.150 mmol of dimethylanilinium tetrakis(pentafluorophenyl)borate [Me$_2$NHPhB(C$_6$F$_5$)$_4$], and 0.9 mmol of triisobutylaluminum were added to a glass container in a glove box under a nitrogen atmosphere, and 40 mL of toluene was further added to obtain a catalyst solution. The catalyst solution was added into the pressure-resistant stainless steel reactor and heated to 60° C.

Next, ethylene was charged into the pressure-resistant stainless steel reactor at a pressure of 1.5 MPa, and copolymerization was performed at 75° C. for a total of 4 hours. During the copolymerization, 140 g of a toluene solution containing 34 g of 1,3-butadiene was continuously added at a rate of 0.6 mL to 1.0 mL per minute.

Next, 1 mL of an isopropanol solution of 5 mass % of 2,2'-methylene-bis (4-ethyl-6-t-butylphenol) (NS-5) was added into the pressure-resistant stainless steel reactor to stop the reaction. Next, a large amount of methanol was used to separate a copolymer, and the copolymer was vacuum dried at 50° C. to obtain Copolymer D.

Example 5

A 2000 mL pressure-resistant stainless steel reactor was sufficiently dried, and 140 g of styrene and 560 g of toluene were added into the reactor.

In addition, 0.27 mmol of mono(bis(1,3-tert-butyldimethylsilyl)indenyl) bis(bis(dimethylsilyl)amido) gadolinium complex 1,3-[(t-Bu)Me$_2$Si]$_2$C$_9$H$_5$Gd[N(SiHMe$_2$)$_2$], 0.283 mmol of dimethylanilinium tetrakis(pentafluorophenyl)borate [Me$_2$NHPhB(C$_6$F$_5$)$_4$], and 1.2 mmol of diisobutylaluminum hydride were added to a glass container in a glove box under a nitrogen atmosphere, and 34 mL of toluene was further added to obtain a catalyst solution. The catalyst solution was added into the pressure-resistant stainless steel reactor and heated to 60° C.

Next, ethylene was charged into the pressure-resistant stainless steel reactor at a pressure of 1.5 MPa, and copolymerization was performed at 75° C. for a total of 9 hours. During the copolymerization, 113 g of a toluene solution containing 27 g of 1,3-butadiene was continuously added at a rate of 0.1 mL to 0.3 mL per minute.

Next, 1 mL of an isopropanol solution of 5 mass % of 2,2'-methylene-bis (4-ethyl-6-t-butylphenol) (NS-5) was added into the pressure-resistant stainless steel reactor to stop the reaction. Next, a large amount of methanol was used to separate a copolymer, and the copolymer was vacuum dried at 50° C. to obtain Copolymer E.

Example 6

A 2000 mL pressure-resistant stainless steel reactor was sufficiently dried, and 140 g of styrene and 560 g of toluene were added into the reactor.

In addition, 0.173 mmol of mono(bis(1,3-tert-butyldimethylsilyl)indenyl) bis(bis(dimethylsilyl)amido) gadolinium complex 1,3-[(t-Bu)Me$_2$Si]$_2$C$_9$H$_5$Gd[N(SiHMe$_2$)$_2$], 0.19 mmol of dimethylanilinium tetrakis(pentafluorophenyl)borate [Me$_2$NHPhB(C$_6$F$_5$)$_4$], and 1.21 mmol of diisobutylaluminum hydride were added to a glass container in a glove box under a nitrogen atmosphere, and 31 mL of toluene was further added to obtain a catalyst solution. The catalyst solution was added into the pressure-resistant stainless steel reactor and heated to 60° C.

Next, ethylene was charged into the pressure-resistant stainless steel reactor at a pressure of 1.5 MPa, and copolymerization was performed at 75° C. for a total of 4 hours. During the copolymerization, 69 g of a toluene solution containing 16 g of 1,3-butadiene was continuously added at a rate of 0.3 mL to 0.4 mL per minute. After performing the copolymerization for an hour, 102 g of a toluene solution containing 26 g of styrene was continuously added at a rate of 0.7 mL to 0.9 mL per minute over 3 hours.

Next, 1 mL of an isopropanol solution of 5 mass % of 2,2'-methylene-bis (4-ethyl-6-t-butylphenol) (NS-5) was added into the pressure-resistant stainless steel reactor to stop the reaction. Next, a large amount of methanol was used to separate a copolymer, and the copolymer was vacuum dried at 50° C. to obtain Copolymer F.

Comparative Example 2

Polymerization was performed under the same conditions as in Example 1 except that styrene was not used, to obtain Copolymer b.

The contents (mol %) of butadiene, ethylene and styrene of Copolymers a and b obtained in Comparative Examples and Copolymers A to F obtained in Examples were measured with the following method.

The contents (mol %) of ethylene, styrene, and butadiene moieties in the obtained copolymers were determined from the integral ratio of each peak in $^1$H-NMR spectrum (100° C. d-tetrachloroethane standard: 6 ppm). More specifically, the contents were determined from the integral ratio of aromatic hydrogen in the styrene unit (5H: 7.4 ppm to 6.4 ppm), olefin hydrogen in the butadiene unit (hydrogen bonded to a double bond) (2H: 5.3 ppm to 5.5 ppm) and each aliphatic hydrogen (styrene (3H)+butadiene (4H)+ethylene (1H): 1.4 ppm to 2.4 ppm) in the copolymers. The results are listed in Table 1. The results indicate that the copolymers obtained in Comparative Example 1 and Examples were multicomponent copolymers having butadiene units, ethylene units, and styrene units. The copolymer obtained in Comparative Example 2 was a copolymer having butadiene units and ethylene units.

The obtained multicomponent copolymers and Copolymer b were each subjected to DSC measurement by raising the temperature from −150° C. to 150° C. at a heating rate of 10° C./min in accordance with JIS K 7121-1987. The endothermic peak (enthalpy relaxation) during 0° C. to 100° C. at that time was determined. The results are also listed in Table 1.

|  | Comparative Example 1 Copolymer a | Example 1 Copolymer A | Example 2 Copolymer B | Example 3 Copolymer C | Example 4 Copolymer D | Example 5 Copolymer E | Example 6 Copolymer F | Comparative Example 2 Copolymer b |
|---|---|---|---|---|---|---|---|---|
| Butadiene unit content (mol %) | 11 | 6 | 9 | 10 | 12 | 6 | 14 | 41 |
| Ethylene unit content (mol %) | 80 | 88 | 87 | 85 | 75 | 83 | 81 | 59 |
| Styrene unit content (mol %) | 9 | 6 | 4 | 5 | 13 | 11 | 5 | 0 |
| Energy at endothermic peak (J/g) | 20 | 47 | 72 | 68 | 42 | 36 | 58 | 50 |
| Mn | 150,000 | 124,000 | 126,000 | 151,000 | 177,000 | 167,000 | 123,000 | 310,000 |
| Mw | 483,000 | 363,000 | 282,000 | 314,000 | 409,000 | 388,000 | 303,000 | 2,610,000 |
| Mp | 237,000 | 181,000 | 228,000 | 247,000 | 271,000 | 277,000 | 212,000 | 490,000 |
| Mw/Mn | 3.21 | 2.91 | 2.24 | 2.08 | 2.31 | 2.32 | 2.46 | 8.42 |

Rubber compositions were prepared with a conventional method using each of the obtained multicomponent copolymers and Copolymer b according to the composition listed in Table 2. Next, the rubber compositions were vulcanized at 160° C. for 30 minutes to obtain vulcanized rubber compositions.

TABLE 2

| | | Comparative Example 1 | Example 1 | Example 2 | Example 3 | Example 4 | Example 5 | Example 6 | Comparative Example 2 |
|---|---|---|---|---|---|---|---|---|---|
| Rubber composition compounding amount (Parts by mass) | Multicomponent copolymer a | 100 | — | — | — | — | — | — | — |
| | Multicomponent copolymer A | — | 100 | — | — | — | — | — | — |
| | Multicomponent copolymer B | — | — | 100 | — | — | — | — | — |
| | Multicomponent copolymer C | — | — | — | 100 | — | — | — | — |
| | Multicomponent copolymer D | — | — | — | — | 100 | — | — | — |
| | Multicomponent copolymer E | — | — | — | — | — | 100 | — | — |
| | Multicomponent copolymer F | — | — | — | — | — | — | 100 | — |

TABLE 2-continued

|  |  | Comparative Example 1 | Example 1 | Example 2 | Example 3 | Example 4 | Example 5 | Example 6 | Comparative Example 2 |
|---|---|---|---|---|---|---|---|---|---|
|  | Copolymer b | — | — | — | — | — | — | — | 100 |
|  | Silica | 55 | 55 | 55 | 55 | 55 | 55 | 55 | 55 |
|  | Silane coupling agent | 5 | 5 | 5 | 5 | 5 | 5 | 5 | 5 |
|  | Oil etc. |  |  |  | See the note |  |  |  |  |
| Physical | $TS_b$ (index) | 100 | 108 | 105 | 106 | 108 | 110 | 107 | 45 |
| properties | Eb (index) | 100 | 164 | 160 | 160 | 166 | 175 | 161 | 89 |

The types and amounts of oil and other additives in Comparative Example 1 to Example 6 and Comparative Example 2 in Table 2 are as follows.
Oil: 10 parts by mass
Stearic acid: 2.0 parts by mass
WAX: 2.0 parts by mass
Age resistor: 1.0 part by mass
Zinc oxide: 2.5 parts by mass
Vulcanization accelerator 1: 1.0 part by mass
Vulcanization accelerator 2: 1.0 part by mass
Vulcanization accelerator 3: 1.0 part by mass
Sulfur: 1.4 parts by mass Evaluation of Rupture Strength and Breaking Elongation A dumbbell-shaped Type 3 test piece was obtained from each vulcanized rubber composition, and the test piece was subjected to a tensile test at 100° C. in accordance with JIS K6251 to measure the rupture strength ($TS_b$) and the breaking elongation (Eb). The measured value of each vulcanized rubber composition was indicated as an index with the measured value of Comparative Example 1 being 100. The results are also listed in Table 2. The larger index value, the better rupture strength or breaking elongation is.

Examples in which 1,3-butadiene was continuously added had more excellent rupture strength and breaking elongation than Comparative Example 1.

INDUSTRIAL APPLICABILITY

According to the present disclosure, it is possible to provide a method for producing a multicomponent copolymer with which a multicomponent copolymer having excellent rupture strength can be obtained, and to provide a copolymer, a rubber composition and a tire having excellent rupture strength.

REFERENCE SIGNS LIST

1 reactor

The invention claimed is:

1. A method for producing a multicomponent copolymer having a conjugated diene unit, a non-conjugated olefin unit and an aromatic vinyl unit, the method comprising the step of:
   dividing a conjugated diene compound into a first portion and a second portion;
   providing a reactor containing a catalyst, a non-conjugated olefin compound, an aromatic vinyl compound and the first portion of the conjugated diene compound;
   adding continuously or intermittently continuously the second portion of the conjugated diene compound into the reactor; and
   wherein the amount of the first portion of the conjugated diene compound is 0.001 mol to 1 mol.

2. The method according to claim 1, further comprising dividing a non-conjugated olefin compound into a first portion and a second portion, and dividing an aromatic vinyl compound into a first portion and a second portion before the step of providing;
   adding at least one selected from the group consisting of the second portion of the non-conjugated olefin compound and the second portion of the aromatic vinyl compound into the reactor after the step of providing; and
   wherein the non-conjugated olefin compound and the aromatic vinyl compound in the reactor of the step of providing is the first portion of the non-conjugated olefin compound and the first portion of the aromatic vinyl compound, respectively.

3. The method according to claim 1, wherein the time for adding continuously or intermittently continuously the second portion of the conjugated diene compound is 10 seconds to 100 hours.

4. The method according to claim 1, wherein the second portion of the conjugated diene compound is continuously or intermittently continuously added in an amount of 0.1 mmol to 20 mmol per minute.

5. The method according to claim 1, wherein
   a total amount of the non-conjugated olefin compound used is 40 mol % to 99.8 mol %,
   a total amount of the aromatic vinyl compound used is 0.1 mol % to 30 mol %, and
   a total amount of the conjugated diene compound used is 0.01 mol % to 30 mol %, with respect to a total amount of the non-conjugated olefin compound, the aromatic vinyl compound and the conjugated diene compound used.

6. The method according to claim 1, wherein
   the multicomponent copolymer has a conjugated diene unit content of 1 mol % to 20 mol %,
   the multicomponent copolymer has a non-conjugated olefin unit content of 60 mol % to 96 mol %, and
   the multicomponent copolymer has an aromatic vinyl unit content of 3 mol % to 20 mol %.

* * * * *